United States Patent [19]
Farwaha et al.

[11] Patent Number: 5,959,024
[45] Date of Patent: Sep. 28, 1999

[54] ACRYLIC LATEX BINDERS PREPARED WITH SACCHARIDE STABILIZERS

[75] Inventors: Rajeev Farwaha, Brampton; Lien Phan, Mississauga, both of Canada; John S. Thomaides, Berkeley Heights, N.J.; Judie Mae Tinamisan, Mississauga, Canada

[73] Assignee: National Starch and Chemical Investment Holding Corporation, Wilmington, Del.

[21] Appl. No.: 08/884,806

[22] Filed: Jun. 30, 1997

[51] Int. Cl.$^6$ .................. C08K 5/16; C08L 1/00
[52] U.S. Cl. .......................................................... 524/716
[58] Field of Search ................................................ 524/716

[56] References Cited

U.S. PATENT DOCUMENTS

| | | | |
|---|---|---|---|
| 3,769,248 | 10/1973 | Kovats | 260/17.4 ST |
| 4,331,578 | 5/1982 | Blount | 524/791 |
| 5,334,621 | 8/1994 | Beshouri | 521/64 |
| 5,340,394 | 8/1994 | Elsamanoudi | 106/500 |
| 5,340,842 | 8/1994 | Adamski et al. | 521/64 |
| 5,362,762 | 11/1994 | Beshouri | 521/64 |
| 5,401,428 | 3/1995 | Gerling et al. | 252/8.6 |
| 5,416,075 | 5/1995 | Carson et al. | 514/23 |

FOREIGN PATENT DOCUMENTS

| | | | |
|---|---|---|---|
| 0 535 534 A1 | 4/1993 | European Pat. Off. | A61K 9/51 |
| 0 569 869 A1 | 11/1993 | European Pat. Off. | C07H 15/04 |

OTHER PUBLICATIONS

Heyns, Kurt, "Perspektiven für zuckerhaltige Ampiphile mit Amidbindung", starch/starke 40 (1988) Nr. 12, S. 476–488.

Hughes, F. A. and Lew, B. W., "Physical and Functional Properties of Some Higher Alkyl Polyglucosides", Journal of the American Oil Chemists' Society, vol. 47, pp. 162–167.

Charreyre, M.T. et al., "Preparation and characterization of polystyrene latexes bearing disaccharide surface groups". Colloid & Polymer Science, 271:668–679 (1993).

Boyer, B. et al., "Amphiphillic Properties of a Polymerized Glycollpid Surfactant", J. Chem. Soc. Perkin Trans. 2(1991), pp. 1311–1317.

Boyer, B. et al., "Preparation Et Proprietes Solubilisantes De Micelles . . . ", Tetrahedron Letters, vol., 32, No. 9, pp. 1191–1194 (1991).

Demharter, S. et al., "Synthesis and gel formation of amphlphilic semicarbazones containing saccharide units", Colloid Polym Sci 273:661–674 (1995).

Kirk–Othmer, "Encyclopedia of Chemical Technology", Fourth Edition, vol. 4, Carbohydrates, pp. 912, 918, 948.

Demharter, S., Richtering, W., Mulhaupt, R., "Emulsion polymerization of styrene in the presence of carbohydrate-–based amphiphiles", Polymer Bulletin 34, 691–698 (1995), pp. 691–698.

Revilla, J., Delair, T., Pichot, C., Gallot, B., "Preparation and properties of comb–like polymers obtained by radical homo– and copolymerization of a liposaccharidic monomer with styrene", Polymer vol. 37 No. 4. pp. 687–698.

*Primary Examiner*—Kriellion S. Morgan
*Attorney, Agent, or Firm*—John D. Thallemer

[57] ABSTRACT

The present invention is directed to the use of nonpolymerizable, hydrophobically-modified saccharides as emulsion stabilizers during the synthesis of acrylic latexes, and coating compositions prepared with the acrylic latexes which has been prepared using the saccharide stabilizers.

8 Claims, No Drawings

ACRYLIC LATEX BINDERS PREPARED WITH SACCHARIDE STABILIZERS

FIELD OF THE INVENTION

This invention relates to the use of hydrophobically-modified saccharide derivatives as stabilizers in the synthesis of acrylic latex binders and coating compositions prepared utilizing the saccharide-stabilized acrylic latex binders.

BACKGROUND OF THE INVENTION

Acrylic-based latex paints employ acrylic latex binders as film formers and binders for pigments, fillers and the like, which are used in latex paints. The latex binders typically comprise acrylic emulsion polymers. The properties that are desirable in acrylic latex binders for use in coating compositions are uniform particle size, mechanical stability, especially at high shear, and the absence of coagulum. Additionally, the latex should dry to a clear, glossy and water resistant film. The properties that are desirable in an acrylic latex-based coating compositions are freeze thaw stability, gloss, abrasion resistance, block resistance, controlled drying time and proper rheological properties.

Traditionally, emulsifying agents such as anionic surfactants are used to control the latex particle size. Also, non-ionic emulsifiers such as nonyl phenol surfactants are used to stabilize the latex to give shear stability and freeze-thaw stability. With respect to acrylic latexes, the standard stabilizers are alkyl phenol ethoxylate (APE) surfactants. As APE surfactants and their degradation products are suspected as being environmentally unfriendly, there is a growing trend to find alternative stabilizers which are environmentally friendly and which provide all of the properties required for use in acrylic latex binders and paints.

Extensive studies have been conducted on the use of linear alcohol and fatty acids as replacements for APE surfactants. Some of the linear alcohols have been found to work as stabilizers, but the performance generally has not been as good as that of the APE. Accordingly, there is a need for new class of stabilizers for use in preparing acrylic latex binders.

The use of nonpolymerizable carbohydrate-based amphiphiles to stabilize latexes of polystyrene has been reported, *Emulsion Polymerization of Styrene in the Presence of Carbohydrate-based Amphiphiles*, Demharter et al Polymer Bulletin 34, 691–696 (1995). As noted therein, N-alkyl and N-alkyl-N'-methyl semicarbazones of maltose and maltotriose were examined as non-ionic emulsifiers in the preparation of polystyrene via emulsion polymerization in order to understand the influence of alkyl chain length and amphiphile concentrations on critical micelle concentration, latex particle sizes, particle size distributions, and rheology. The report fails to address on any level the issue of whether or not the amphiphiles would be useful to stabilize other types of emulsion polymerization, e.g., preparation of acrylic latex via emulsion polymerization, or that latexes prepared with the amphiphiles would be able to provide freeze-thaw stability and other required paint properties, such as abrasion resistance and gloss, to latex acrylic paint compositions which comprised the latexes stabilized with the amphiphiles.

It now has been found that certain nonpolymerizable, saccharide-derivatives are useful as emulsion stabilizers during the preparation of acrylic-based latex binders via emulsion polymerization. The binders are environmentally friendly as opposed to APE surfactants, in that the saccharide materials are derived from renewable resources rather than from petrochemicals, as are ethoxylated materials, and ultimately are biodegradable. The latex binders are capable of providing both freeze-thaw stability and sufficient or improved properties of gloss and abrasion resistance to acrylic latex-based paints employing the acrylic latex binders.

SUMMARY OF THE INVENTION

The present invention is directed to the use of nonpolymerizable, hydrophobically-modified derivatives of saccharides (hereinafter "saccharide stabilizers") as emulsion stabilizers during the synthesis of stable acrylic latexes, and coating compositions which employ the stable acrylic latex as a binder. The saccharide stabilizers comprise a hydrophobic moiety and a minimum amount of monosaccharide units which is effective to provide latex paints which employ such latex binders with freeze thaw stability. These saccharide stabilizers produce stable emulsions of acrylic polymers which possess all the properties that are required for use in an acrylic latex binder. Coating compositions prepared with the inventive acrylic latex binders have superior paint properties compared to coating compositions prepared with acrylic latex binders stabilized by APE surfactants.

DETAILED DESCRIPTION OF THE INVENTION

The acrylic latex binders of this invention are particularly advantageous for use in aqueous coating compositions, such as acrylic latex paint compositions. The first advantage is that the coating compositions prepared from these latexes unexpectedly exhibit better abrasion resistance when compared to coatings utilizing a similar acrylic latex binder which was stabilized with APE surfactants, which are standard for use in the manufacture of acrylic latex binders. The second advantage is that the acrylic latex binders of the present invention have narrow particle size distribution, resulting in much better gloss in coatings prepared with the inventive acrylic latex, when compared to coatings prepared from similar conventional acrylic latexes stabilized with APE surfactants. The third advantage of the acrylic latex binders of the present invention is that they provide freeze-thaw stability to acrylic latex paint compositions which utilize such acrylic latex binders, compared to latex binders prepared with nonpolymerizable, hydrophobically-modified saccharides falling outside the scope of the present invention. Finally, these binders may be free of APE surfactants and, therefore, may be more environmentally friendly.

The saccharide stabilizer used during emulsion polymerization to stabilize the acrylic latex binders of the present invention must provide stability during polymerization, with no or essentially no coagulum being generated. This is one of the most important parameters in the synthesis of the emulsion polymers, as coagulum will create problems in the manufacture of the latex and will result in adverse effects in film formation properties of the aqueous coatings employing the latex binders. In addition, the latex binders must be stable from phase separation after preparation, meaning that the acrylic polymer particles do not agglomerate and/or settle subsequent to polymerization, but remain dispersed in the aqueous phase. Furthermore, the latex binders must possess excellent shear stability in order to be transported from one location to another, such as by pumping through pipes during processing, or transportation after manufacture, and to allow for vigorous mixing of ingredients in the paint manufacturing process.

The latex binders stabilized by the saccharide stabilizers should dry to give a clear, smooth, glossy and water-resistant film. The saccharide stabilizer used to stabilize the latex binders must impart uniform particle size, or narrow particle size distribution, in order to provide better packing of the latex polymer particles in paints and to enhance gloss of the paint. Also, the latex binders according to this invention should provide latex paints which withstand repeated cycles of freezing/thawing.

The latex binder stabilized with the saccharide must provide sufficient abrasion resistance in order to function as a binder in the acrylic latex paint composition. Generally, the level of abrasion resistance required of a latex paint will depend upon the anticipated end-use of the paint. However, higher levels of abrasion resistance are desirable in semi-gloss and flat paint formulations. The latex binders according to this invention must have rheological behaviour (levelling, brush drag, thixotropy) comparable to that of alkyd paints, as these properties are important in the applications of paint.

It now has been discovered that certain nonpolymerizable, hydrophobically-modified saccharide surfactants, or stabilizers, meet the above requirements. In fact, the nonpolymerizable saccharide stabilizers of the present invention not only are suitable replacements for APE surfactants in preparing acrylic latex binders, but the paints prepared utilizing latexes prepared in the presence of the saccharide stabilizers surprisingly were found to exhibit superior properties compared to those paints prepared with latexes stabilized with APE surfactants. By nonpolymerizable, it is meant that the saccharide stabilizers are absent of groups which would render the saccharide stabilizers polymerizable with monomers used to prepare the acrylic latexes. One example of such a group is an α,β-ethylenically unsaturated group. Examples of polymerizable saccharides, which are exclusive of the saccharide stabilizers of the present invention, are disclosed in U.S. Pat. No. 5,563,252, in the name of Thomaides et al.

It is essential that the saccharide stabilizer comprise an amount of monosaccharide units which is effective to provide the acrylic latex paints which employ such latex binders with freeze-thaw stability. By monosaccharide unit, it is meant a polyhydroxy aldehyde or polyhydroxy ketone which cannot be broken down by hydrolysis, as described/defined in Encyclopedia of Chemical Technology, Fourth Edition; pp. 912, 918. Preferably, the monosaccharide units are selected from the group consisting of 5-carbon polyhydroxy aldehydes, 6-carbon polyhydroxy aldehydes, 5-carbon polyhydroxy ketones, and 6-carbon polyhydroxy ketones. Most preferably, saccharides comprising 6-carbon polyhydroxy aldehydes and 6-carbon polyhydroxy ketones are preferred as starting materials for the saccharide stabilizers. The monosaccharide units preferably are linked by glycosidic bonds.

Saccharides from which the stabilisers are derived comprise an average of greater than or equal to 1.9 linked monosaccharide units. Preferably, the saccharide stabilizer is derived from a saccharide which comprises an average of at least two linked monosaccharide units, and most preferably at least two linked monosaccharide units. Nonpolymerizable saccharide stabilizers derived from saccharides comprising a single monosaccharide unit or saccharides comprising an average of less that 1.7 linked monosaccharide units unexpectedly were found not to provide stable latex binders, or were found to provide latex binders which would not provide freeze thaw stable latex paints. Saccharide stabilizers derived from saccharides comprising two or more monosaccharide units provide stable acrylic latexes which provide improved adhesion resistance to acrylic latex paints, compared to acrylic latex paints prepared with APE surfactants, in addition to freeze thaw stability.

The saccharide stabilizers comprise at least one hydrophobic moiety of the type found in conventional emulsion polymerization stabilizers, such as the APE surfactants. Such hydrophobic groups include without limitation, for example, $C_8$–$C_{22}$ alkyl groups, aromatic groups, alkyl aromatic groups, and polyalkylene ethers such as those obtained by the polymerisation of propylene oxide, butylene oxide and mixtures thereof.

A preferred class of nonpolymerizable saccharide stabilizers is the aldonamide class represented by Structure I, below.

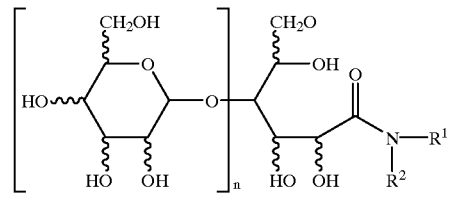

Structure I wherein $R^1$ or $R^2$ may be H or a $C_1$–$C_4$ alkyl group, provided that one of $R^1$ or $R^2$ is a hydrophobic moiety and the average of n is greater than 0.9. Preferably, the average of n is at least 1. More preferably, n is greater than or equal to 1.

Another preferred class of saccharide stabilizers is the N-alkanoyl 1-amino-1-dioxysaccharide class represented by Structure II, below.

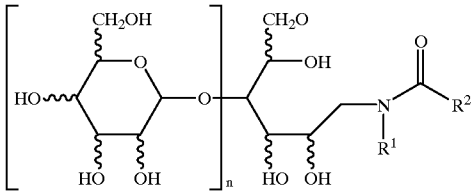

Structure II wherein $R^1$, $R^2$ and n have the same definition as in Structure I.

Another preferred class of saccharide stabilizers is the N-alkanoyl-1-aminosaccharide class represented by Structure III, below.

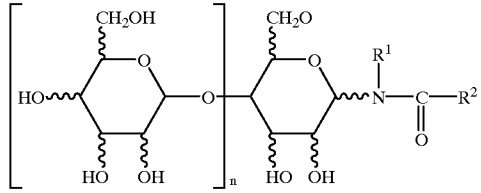

Structure III wherein $R^1$, $R^2$ and n have the same definition as in Structures I and II.

Another preferred class of saccharide stabilizers is the 4-alkyl-semicarbazone class, represented by Structure IV, below.

Structure IV

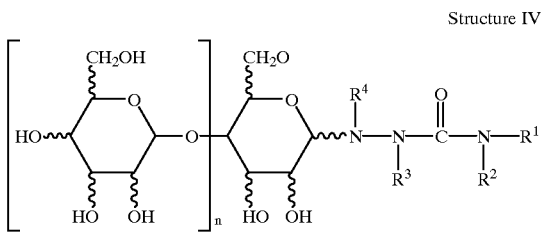

wherein $R^1, R^2, R^3$ and $R^4$ may be H or a $C_1$–$C_4$ alkyl group, provided that one of $R^1$, $R^2$, $R^3$ or $R^4$ is a hydrophobic moiety and n has the same definition as in Structures I, II and III.

The nonpolymerizable saccharide stabilizer represented by Structure I can be derived readily by those skilled in the art of synthesis. For example, a disaccharide (two monosaccharide units) is oxidized to an aldonic acid. The aldonic acid is dehydrated to aldonic acid lactone, which then can be condensed with a $C_8$–$C_{22}$ alkyl amine to yield a saccharide stabilizer of Structure I.

Saccharide stabilizers of Structure II can be derived readily by those skilled in the art of synthesis. For example, a disaccharide is mixed with a $C_1$–$C_4$ primary amine, ammonia, or hydrazine; a hydrogenation catalyst is added; and hydrogen is introduced to the reaction mixture. Under the appropriate conditions, an amino saccharide is formed. The amino saccharide then is condensed with a $C_8$–$C_{22}$ carboxylic acid, carboxylic acid chloride, or carboxylic acid ester, to yield a saccharide stabilizer of Structure II.

Saccharide stabilizers of Structure III can be derived readily by those skilled in the art of synthesis. For example, a disaccharide is mixed with ammonia in a suitable solvent and the resulting 1-amino disaccharide is condensed with a $C_8$–$C_{22}$ carboxylic acid, carboxylic acid chloride, or carboxylic acid ester to yield a saccharide stabilizer of Structure III.

Saccharide stabilizers of Structure IV are prepared by the method described by Demharter, et al., in *Colloid Polym Sci.* 1995, 273, 661–674.

According to one embodiment of this invention, there are provided polymeric acrylic latex binders which comprise acrylic polymers which are prepared via emulsion polymerization of monomers in water, using as a stabilizer a nonpolymerizable, hydrophobically-modified saccharide stabilizer as described above. As used herein, the terms "acrylic", "acrylic polymer" or "acrylic latex" are intended to denote those polymers or latexes comprising polymers which are prepared with at least about 60 pphm (parts by weight of monomer per hundred parts by weight of total monomer used to prepare the acrylic polymer) selected from the group consisting of a $C_1$–$C_4$ alkyl ester of a $C_3$–$C_5$ monocarboxylic or dicarboxylic acid comprising an α,β-ethylenically unsaturated group. Particularly preferred are $C_1$–$C_4$ alkyl esters of acrylic and methacrylic acid.

The polymers may be prepared with from 0 to about 40 pphm of a styrenic monomer, such as styrene, halogenated-styrene and alkyl-substituted styrene. Other optional monomers include ionic monomers to impart mechanical stability and monomers to enhance wet adhesion.

The polymer also may comprise 0 to 2 pphm of the polymerized residue of an ionic monomer. In preferred embodiments, not more than about 1 pphm of the ionic monomer is used. The ionic monomers are utilized to impart mechanical stability to the latex binder and the latex paints, i.e., they are stable upon application of shear to the latex binders or paints, such as during pumping of the latex binder and/or the paint composition during processing and during addition of the latex binder to the "grind" portion of the paint formulation during the preparation thereof. The "grind" is that portion of the paint formulation which includes the pigments, fillers and the like. The pigments and fillers are "ground" using conventional mixing techniques, to a particular Hegman dispersion value. The grind is then "let down", that is, the balance of the paint composition, including the latex binder and any balance of water, are added to the grind and the mixed. Typical classes of ionic monomers include, but are not limited to, alpha, beta-ethylenically unsaturated $C_3$–$C_8$ monocarboxylic and $C_4$–$C_8$ dicarboxylic acids, including the anhydride thereof, and the $C_4$–$C_8$ alkyl half esters of the a,b-ethylenically unsaturated $C_4$–$C_8$ dicarboxylic acids. Exemplary ionic monomers include acrylamido methyl propane, sulfonic acid, styrene sulfonate, sodium vinyl sulfonate, acrylic acid and methacrylic acid, and the $C_4$–$C_8$ alkyl half esters of maleic acid, maleic anhydride, fumaric acid, and itaconic acid. Particularly preferred ionic monomers include acrylic acid and methacrylic acid.

In order to optimize the wet adhesion of the latex paint formulation, the polymer may comprise the polymerized residue of from 0 to about 2 pphm of a wet adhesion monomer, or a combination of wet adhesion monomers. These monomers are well known in the art and include aminoethyl acrylate and metacrylate, dimethylaminopropylacrylate and methacrylate, 3-dimethylamino-2,2-dimethylpropyl-1-acrylate and methacrylate, 2-N-morpholinoethyl acrylate and methacrylate, 2-N-piperidinoethyl acrylate and methacrylate, N-(3-dimethylaminopropyl) acrylamide and methacrylamide, N(3-dimethylamino-2, 2-dimethylpropyl) acrylamide and metacrylamide, N-dimethylaminomethyl acrylamide and methacrylamide, N-dimethylaminomethyl acrylamide and methacrylamide, N-(4-morpholino-methyl) acrylamide a methacrylamide, vinylimidazole, vinylpyrrolidone, N-(2-methacryloyloxyethyl) ethylene urea, N-(2-methacryloxyacetamidoethyl)-N, N'-ethyleneurea, allylalkyl ethylene urea, N-methacrylamidomethyl urea, N-methacryoyl urea, N-[3-(1,3-diazzcryclohexan)-2-on-propylmethacylamide, 2-(1 -imidazolyl) ethyl methacrylate, 2-(1 -imidazolidin-2-on)ethylmethacrylate, N-(methacrylamido)ethyl urea (DV 2422, Rhone-Poulenc) and allyl ureido wet adhesion monomer (Sipomer WAM@, Rhone-Poulenc). When utilized, the wet adhesion monomer will be present in an amount from 0.2 to 2 pphm.

The emulsion polymerization of the polymer can be accomplished by known procedures for polymerization in aqueous emulsion. Optionally, conventional seeding procedures can be employed to aid in controlling polymerization to achieve the desired average particle size and particle size distribution. If seeding is employed, the polymer seed will be present in amounts that correspond to about 0.1% to 8% by weight of the total polymer, and will range in size from about 20 to 60% of the diameter of the polymer particles to be formed.

The seed latex can constitute a previously prepared latex or polymer powder, or it can be prepared in situ. The monomeric composition of the seed latex can vary; however, it is preferable that it be substantially the same as that of the polymer.

Suitable free radical polymerization catalysts are the catalysts known to promote emulsion polymerization and include water-soluble oxidizing agents, such as, organic peroxides (e.g., t-butyl hydroperoxide, cumene hydroperoxide, etc.), inorganic oxidizing agents (e.g., hydrogen peroxide, potassium persulfate, sodium persulfate, ammonium persulfate etc.) And those catalysts that are activated in the water phase by a water-soluble reducing agent. Such catalysts are employed in the catalytic amount sufficient to cause polymerization. As a general rule, a catalytic amount ranges from about 0.1 to 5 pphm. As alternatives to heat or catalytic compounds to activate the polymerization, other free radical producing means, such as exposure to activating radiation, can be employed.

Suitable emulsifying agents which optionally may be used in emulsion polymerization in addition to the saccharide-derived stabilizer of the present invention include anionic, cationic, and nonionic emulsifiers. At least one anionic emulsifier is utilized and one or more nonionic emulsifiers also may be used in addition to the saccharide-derivative stabilizer. Representative anionic emulsifiers are the alkyl aryl sulfonates, alkali metal alkyl sulfates, the sulfonated alkyl esters, and the fatty acid soaps. Specific examples include sodium dodecylbenzene sulfonate, sodium butylnapthalene sulfonate, sodium lauryl sulfate, disodium dodecyl diphenyl ether disulfonate, N-octadecyl disodium sulfosuccinate and dioctyl sodium sulfosuccinate. The emulsifying agents are employed in amounts effective to achieve adequate emulsification and to provide desired particle size and particle size distribution.

Other ingredients known in the art to be useful for various specific purposes in emulsion polymerization, such as acids, salts, chain transfer agents, and chelating agents, can also be employed in the preparation of polymer. For example, if the polymerizable constituents include a monomethylenically unsaturated carboxylic acids monomer, polymerization under acidic conditions (pH 2 to 7, preferably 2 to 5) is preferred. In such instances, the aqueous medium can include those weak acids and their salts that are commonly used to provide a buffered system at the desired pH range.

The manner of combining the polymerization ingredients can be by various known monomer feed methods, such as, continuous monomer addition, incremental monomer addition, or addition in a single charge of the entire amount of monomers. The entire amount of the aqueous medium with polymerization additives can be present in the polymerization vessel before introduction of the monomers, or alternatively, the aqueous medium, or a portion of it can be added continuously or incrementally during the course of the polymerization.

Polymerization is initiated by heating the emulsified mixture with continued agitation to a temperature usually between about 50° C. to 100° C., preferably between 60° C. to 100° C. Polymerization is continued by maintaining the emulsified mixture at the selected temperature until conversion of the monomer or monomers to polymer has been reached.

Following polymerization, the solids content of the resulting aqueous heterogeneous polymer latex can be adjusted to the level desired by the addition of water or by the removal of water by distillation. Generally, the desired level of polymeric solids content is from about 20 to 60% by weight on a total weight basis.

The size of the polymer particles can vary; however, for optimum water resistant, it is preferable that the particles have an average diameter of less than 500 nanometers. In general, for the polymer of this invention, the smaller the average particle size, the more water resistant the polymer. Suitable particle sizes generally can be achieved directly from the polymerization. However, screening of the resulting latex to remove particles outside the desired range, and thus narrowing the particle size distribution, may be employed.

For various applications, it is sometimes desirable to have small amounts of additives, such as, surfactants, bactericides, pH modifiers, and antifoamers, incorporated in the latex. This may be done in a conventional manner and at any convenient point in the preparation of the latexes.

In a second embodiment of the invention, acrylic latex paint compositions utilize the acrylic latex of the present invention in amounts effective to function as a binder in the latex paint. The paints are formulated using techniques known to those skilled in the art of manufacturing paint. Generally, water, defoamer, pigment, filler and surfactant are combined to form the grind, where the pigments and fillers are ground to a desired particle size as indicated by a Hegman reading of 2 to 3. Additional water, latex binder, rheology modifiers, biocides and the like are added to the grind and the entire batch is blended and adjusted to desired Hegman readings and viscosity.

The following test procedures and semi-gloss latex paint formulation were used to evaluate the acrylic latex binders and paints of the present invention.

Abrasion Resistance (Scrubability) ASTM 24860

A test panel was prepared by drawing a 7.0 mil film of paint on a leneta chart and allowing the paint to dry for 7 days in an open room kept at 23±2° C. and 50±5% relative humidity. The dried chart was affixed to a glass panel and put into a scrub machine equipped with a scrub brush and a basin for holding the test panel. The brush was prepared by immersing it overnight in 2% solution of Triton X-100 surfactant. The brush was placed in the machine holder and the test scrub panel was put under the brush. The brush bristles were spread evenly with grams of a standardized scrub medium (available from Leneta Co.) The panel was then wet with 5 ml of reagent water in the path of the brush. The scrub machine was started and after every 800 strokes before failure, 10 grams of scrub medium and 5 ml of reagent water were added to the brush bristles. The last step was repeated until the coating failed, that is, the number of strokes to the paint at which 0.5 inch of black chart shows through the test panel. The number of strokes to failure was recorded.

Gloss Measurement

A gloss panel was prepared by drawing a 3 mil film of semigloss paint on a leneta penopac chart form 19BR and allowing the paint film to dry for 1 day, 3 days and 7 days in an open room kept at 23±2° C. and 50±5% relative humidity. After the paint film have been dried for 1 day, then gloss was measured. The gloss measurement was repeated after 3 days and 7 days of drying. The machine that was used to measure gloss is a BYK Gardner micro-TRI gloss meter. Six readings were taken and gloss values were recorded.

Freeze-Thaw Stability Test

The paint sample was transferred into a 250 ml stainless steel can and was kept in the freezer for 18 hours at −18° C. Then the sample was removed from the freezer and was allowed to thaw for 24 hours to room temperature. The sample was observed for the flow properties, lump formation and coagulation. The sample was considered to pass if it exhibited no coagulation. This cycle of freezing-thawing was repeated until either the paint coagulated or until a total of five cycles were completed with no coagulation. A paint is considered freeze-thaw stable upon passing five cycles.

SEMI-GLOSS PAINT FORMULA

| | Pounds per 100 U.S Gallons |
|---|---|
| Propylene Glycol | 40.0 |
| Colloid 226-35 | 5.5 |
| Colloid 643 | 6.6 |
| Water | 71.0 |
| Titanium 2020 | 300.0 |
| Verwhite (Omya 3) | 50.0 |
| Water | 180.6 |
| Disperse 5–6 Hegman | |
| Water | 30.0 |
| Cellosize QP-4400 | 1.0 |
| Rexol 25/9 | 8.0 |
| Texanol | 7.5 |
| Acrysol TT-935 | 16.0 |
| AMP-95 | 3.0 |
| Colloid 643 | 4.0 |
| Nuosept 95 | 1.5 |
| Water | 14.0 |
| Resyn (50% Solids) | 598.4 |
| | 1337.1 |
| PVC - 25.0 | |
| Weight Solids - 51.27% | |
| Volume Solids - 36.81% | |
| Pounds per U.S. Gallon - 10.87 | |
| 60° Gloss - 55 | |

Source:
1. Colloid 226-35 Dispersant is a proprietary mixture
2. Colloid 643 Defoamer is a proprietary mixture
3. Titanium 2020 is rutile titanium dioxide
4. Verwhite ® is aluminum silicate pigment?
5. Cellosize ® QP-4400
6. Rexol ® 25/9 is a non-ionic surfactant
7. Nuosept ® 95 is a solution of bicyclic oxazolidines, used as preservative, and available from Huis Canada Inc.
8. Hegman is a unit of grind used in the industry
9. Acrysol ® TT-935 is an acrylic polymer associative thickener, available from Rohm & Haas
10. AMP-95 ® is a 2-amino-2-methyl-1-propanol containing 5% water, a multifunctional additive available from Angus Chemical Company

EXAMPLE 1

Latex Preparation

Comparative Latexes

An acrylic latex was prepared using an anionic surfactant Rhodacal® DS-10 (a product of Rhône-Poulenc) and a nonionic surfactant (Igepal® CA-897) as the surfactants. The formula and procedure are given below.

| Ingredients | Grams | Concentration in pphm |
|---|---|---|
| Water | 305.27 | 63.2 |
| Rhodacal DS-10 | 0.6 | 0.12 |
| Monomer Mix | | |
| Water | 160.8 | 26.7 |
| Rhodacal ® DS-10 | 7.1 | 1.18 |
| Igepal ® CA-897 | 26.4 | 4.4 |
| Rohamere ® 6844-0 | 16.88 | 2.55 |
| Methyl methacrylate (MMA) | 313 | 56 |
| Butyl acrylate (BA) | 289 | 44 |
| Catalyst Solution #1 | | |
| Water | 55.6 | 9.2 |
| Sodium persulfate | 3.6 | 0.6 |
| Catalyst Solution #2 | | |
| Water | 66.9 | 12.6 |
| SMBS | 2.1 | 0.35 |

In a 3 liter vessel, equipped with a reflux condenser, addition funnels, and stirrer, initial water was added to the reactor with agitation of 100 rpm. The reactor was heated to 65° C. A 32 gm portion of the monomer mix and 5 gm of the catalyst solution #1 were then charged to the reaction vessel and the reaction mixture was held for 20 minutes at 65° C. The remainder of the monomer mix was metered into the reaction over a period of 4 hours. The catalyst solution #1 & 2 were metered to the reactor over a period of 4.5 hours. The reaction was then held for 20 minutes at 65° C. Then 0.3 gm of tertiary butyl hydroperoxide in 5 g water and 0.3 gm sodium formaldehyde sulfoxylate were added to the reactor. The pH of the dispersion latex was adjusted to 7 to 8 by the addition of 26.6% aqueous ammonium hydroxide solution.

The resulting control latex was designated C1 and had the following physical properties: 50.6% solids, particle size of 148 nm, pH of 7.5 and MFFT of 15° C. Latex C1 was tested for freeze-thaw stability and found to survive five freeze-thaw cycles.

Comparative latex C2 was synthesised using the same procedure and formula as given above, except that a vinyl acetate/butyl acrylate monomer mixture was used in place of the butyl acrylate/methyl methacrylate monomer mixture and 5 pphm of Igepal® CA-897 was used in place of 4.4 pphm of Igepal® CA-897. Latex C2 had P.S. of 570 nm and 55% solids.

Comparative acrylic latexes C3 and C4 were synthesised with 4.4 pphm of Glucopon® APG 225DK (average of less than 0.7 monosaccharide units; derived from saccharide having average of less than 1.7 monosaccharide units) and 4.4 pphm of Glucopon® APG 425N (average of less than 0.4 monosaccharide units; derived from saccharide having average of less than 1.4 monosaccharide units), respectively, both available from Henkel Corporation. Latex C3 had 51.5% solids and P.S. of 152 nm, while Latex C4 had 48.3% solids and P.S. of 156 nm Comparative acrylic latex C5 was synthesized following the same procedure as given above, except that latex C5 was synthesized with 5 pphm of Rexol® 25/407, which is a nonyl phenol surfactant ethoxylated with 40 moles of ethylene oxide, and vinyl acetate and butyl acrylate were used as monomers instead of methyl methacrylate and butyl acrylate. The glass transition of the latex was adjusted to around 20° C. using the Fox equation. $1/T_g$ (polymer)=$W_{(a)}/T_{g\,(a)}+W_{(b)}/T_{g\,(b)}+\ldots$ where $W_{(a)}$ and $W_{(b)}$ are the weight fractions of comonomers (a) and (b) and $T_{g\,(a)}$ and $T_{g\,(b)}$ are the glass transition temperatures of homopolymers (a) and (b), respectively. Glass transition temperatures for various homopolymers are available in many literature sources, including J. Brandup and E. H. Immergut, Polymer Handbook, $2^{nd}$ ed., John Wiley & Sons, New York, pp. 139–192 (1975). Latex C5 has 54.88% solids and a particle size of 580 nm.

Additional comparative acrylic latexes, C6 and C7 were polymerized using the same procedure as described in latex C1, but with 6 pphm of N-lauryl-n-methyl glucamide (0 monosaccharide units; derived from a saccharide comprising a single monosaccharide unit) and N-decyl-N-methyl glucamide (0 saccharide units; derived from a saccharide comprising a single monosaccharide) as stabilizers, respectively. Coagulation was formed throughout the reaction and the final emulsions were not stable.

Also, comparative acrylic latexes C8 and C9 were synthesized using 6 pphm of ethyl glucoside ester EGE-2110 (0 monosaccharide units; derived from a saccharide comprising a single monosaccharide) and EGE-2118 (0 monosaccharide units; derived from a saccharide comprising a single monosaccharide unit) as stabilizers, respectively. The final emulsions of these latexes were stable, but the particle sizes were around 900 nanometers, which is not acceptable in latex paint applications. Comparative acrylic latex C10 was polymerized with EGE-2112 (0 monosaccharide units; derived from a saccharide comprising a single monosaccharide) as a stabilizer. The latex was successfully synthesized at 50% solids only. When latex C11 was synthesized using EGE-2112 at 55% solids, coagulum was formed. The latex C10 had 49.8% solids and P.S. of 375 nm. Latex C10 was evaluated in the semi-gloss paint formulation and exhibited comparable scrub resistance to that of latex C5, although latex C10 failed freeze/thaw stability in paint.

Inventive Latexes

Latexes 1A and 1B were synthesised using the same procedure and formula as described in above, except that 4.4 pphm and 6.0 pphm lactobionamide (LBA; 1 monosaccharide unit; derived from a saccharide comprising two monosaccharide units) was used, respectively, in place of the nonionic surfactant Igepal® CA-897. Latex 1A had 50.5% solids and P.S. of 149 nm. Latex 1B had 51.5% solids and P.S. of 145 nm. Both latexes were tested for freeze-thaw stability and were found to survive five freeze-thaw cycles.

Latex 1C was synthesized using the same procedure as in Comparative Latex C2, but 5 pphm of LBA was used in place of Igepal® CA-897. Latex 1C had P.S. of 400 nm and 55% Solids.

Acrylic latex 1D was synthesized following the same procedure as in Comparative Latex C5, except that 5 pphm of LBA was used in place of Rexol 25/407. Latex 1D had 53.8% solids and P.S. of 519 nm.

Acrylic latex, 1E was polymerized using the same procedure as described in Comparative Latex C2, except that 5 pphm of N-lauryl-n-methyl lactamide (1 monosaccharide unit; derived from a saccharide comprising two monosaccharide units) was used as the stabilizer. Latex 1E had 54.9% solids and P.S. of 432 nm.

EXAMPLE 2

Latexes C1, 1A and 1C were formulated in the semi-gloss paint formulation and were tested for abrasion resistance, freeze-thaw stability, ICI viscosity and gloss measurement. Results are reported in Table 1.

TABLE 1

| Latex | C1 | 1A | 1B |
|---|---|---|---|
| Abrasion Resistance (Strokes to Failure) | 400 | 1540 | 1200 |
| Freeze-thaw Stability Test | passed | passed | passed |
| Gloss | 36 | 46 | 50 |
| ICI | 0.5 | 0.4 | 0.4 |

As indicated by the results in Table 1, the abrasion resistance of paints prepared with inventive latexes 1A and 1B is increased dramatically when compared to abrasion resistance of paints prepared with the control latex C1. In addition, the results in Table 1 show that the ICI (viscosity) value of 1A and 1B were slightly lower than that of $C_1$. Gloss measurements show a 10 unit increase for latex paints prepared with the saccharide-stabilized latexes when compared to paints prepared with comparative latex $C_1$. This a very significant and surprising improvement over latexes prepared with APE surfactants.

Latexes C2 and 1C were formulated in the semi-gloss paint formulation as described above. The samples were tested for freeze-thaw stability, ICI and abrasion resistance. Results are set forth in Table 2.

TABLE 2

| Latex | C2 | 1C |
|---|---|---|
| ICI | 1.2 | 1.25 |
| Abrasion Resistance | 1200 | 2300 |
| Freeze-thaw Test | 5 cycles | 5 cycles |

The results in Table 2 show that a latex paint using the inventive acrylic latex 1C exhibited a significant increase in abrasion resistance when compared to a latex paint using the control latex C2, was slightly better in ICI value and exhibited 5 cycles of freeze-thaw stability.

EXAMPLE 3

Latexes C1, C3 and C4 were formulated in the semi-gloss paint formula and tested for abrasion resistance and freeze-thaw stability. The results are set forth in Table 3.

TABLE 3

| Latex | C1 | C3 | C4 |
|---|---|---|---|
| Abrasion Resistance | 400 | 1500 | 800 |
| Freeze-thaw Stability Test | 5 cycles | 0 | 0 |

The results show that comparative acrylic latexes C3 and C4, stabilized by alkyl polyglycosides Glucopon APG 225 and APG 425N, respectively, exhibited much better abrasion resistance than comparative latex $C_1$, but exhibited no freeze-thaw stability, which is essential to the acrylic latex binders of the present invention.

EXAMPLE 4

Latexes C5 and 1D were formulated in the semi-gloss paint formula and tested for abrasion resistance and freeze-thaw stability. The results are set forth in the Table 4 below.

TABLE 4

|  | C5 | 1D |
|---|---|---|
| Abrasion Resistance (cycle of failure) | 1537 | 2548 |
| Freeze/Thaw stability Test | 5 cycles | 5 cycles |

The results in Table 4 show that latex paints utilising inventive latex 1D resulted in an improvement of 65% in abrasion resistance when compared to the latex paints utilizing comparative latex C5.

EXAMPLE 5

Latex 1E was formulated in a semi-gloss paint formula and evaluated for abrasion resistance. The results are set forth in Table 5.

TABLE 5

| Latex | 1E | C2 |
|---|---|---|
| Abrasion Resistance (cycle of failure) | 1513 | 1295 |
| Freeze/Thaw stability Test | 5 cycles | 5 cycles |

The results in Table 5 show that a latex paint using latex 1E exhibited about a 20% improvement in abrasion resistance when compared to that of a latex paint using the Control 2A latex binder.

As all of the data indicate, one must balance desired properties of abrasion resistance and freeze-thaw stability when selecting the proper saccharide stabilizer of the present invention. While hydrophobically-modified, nonpolymerizable saccharide materials having an average of less than 0.7 saccharide units (derived from saccharides comprising a single monosaccharide unit or saccharides comprising an average of less than 1.7 monosaccharide units) have been found in certain cases to provide acrylic latex binders which impart adequate abrasion resistance to the acrylic paints which employ such binders, such binders do not provide the latex paints with freeze-thaw stability and certain of such materials do not provide stable emulsions at all. Only saccharide stabilizers comprising an average of greater than 0.9 monosaccharide units (derived from saccharides comprising an average of greater than 1.9 monosaccharide units), preferably at least 1 monosaccharide unit (derived from a saccharide comprising at least two monosaccharide units) were found to provide stable emulsions of acrylic polymers which impart both required properties of abrasion resistance and freeze-thaw stability.

We claim:

1. A stable, acrylic latex, comprising:
   an acrylic polymer dispersed in an aqueous phase, characterized in that the acrylic polymer is prepared by emulsion polymerization in the presence of a nonpolymerizable, hydrophobically-modified saccharide stabilizer which is derived from a saccharide comprising an average of greater than or equal to 1.9 monosaccharide units effective to provide freeze-thaw stability to a latex paint which comprises the acrylic latex in an amount effective to function as a binder in the latex paint.

2. The acrylic latex of claim 1 wherein the saccharide stabilizer is derived from a saccharide comprising an average of greater than or equal to 1.9 monosaccharide units.

3. The acrylic latex binder of claim 1 wherein the saccharide stabilizer is derived from a saccharide comprising at least two monosaccharide units.

4. The acrylic latex of claim 1 wherein the acrylic polymer is prepared with at least about 60 parts by weight per hundred parts by weight total monomer used to prepare the acrylic polymer of a monomer selected from the group consisting of a $C_1$–$C_4$ alkyl ester of a $C_3$–$C_5$ monocarboxylic or dicarboxylic acid comprising an $\alpha,\beta$-ethylenically unsaturated group.

5. An acrylic latex paint, comprising:
   a stable, acrylic latex in amounts effective to function as a binder in the acrylic latex paint, which acrylic latex comprises an acrylic polymer dispersed in an aqueous phase, characterized in that the acrylic polymer is prepared by emulsion polymerization in the presence of a nonpolymerizable, hydrophobically-modified saccharide stabilizer which is derived from a saccharide comprising an average of greater than or equal to 1.9 monosaccharide units effective to provide freeze-thaw stability to the latex paint; and
   an ingredient selected from the group consisting of a defoamer, pigment, filler, surfactant, rheology modifier, propylene glycol, and biocide of the type conventionally used in acrylic latex paint compositions.

6. The latex paint of claim 5 wherein the saccharide stabilizer is derived from a saccharide comprising an average of greater than or equal to 1.9 monosaccharide units.

7. The latex paint of claim 5 wherein the saccharide stabilizer is derived from a saccharide comprising at least two monosaccharide units.

8. The latex paint of claim 5 wherein the acrylic polymer is prepared with at least about 60 parts by weight per hundred parts by weight of total monomer used to prepare the acrylic polymer of a monomer selected from the group consisting of a $C_1$–$C_4$ alkyl ester of a $C_3$–$C_5$ monocarboxylic or dicarboxylic acid comprising an $\alpha,\beta$-ethylenically unsaturated group.

* * * * *